(12) United States Patent
Miller

(10) Patent No.: US 6,582,173 B1
(45) Date of Patent: Jun. 24, 2003

(54) APPARATUS AND METHOD OF MANUFACTURING AND COLLATING A PLURALITY OF ADJACENT FASTENERS

(75) Inventor: Christopher T. Miller, Long Beach, CA (US)

(73) Assignee: Master Fasteners International, Inc., Vernon, CA (US)

( * ) Notice: Subject to any disclaimer, the term of this patent is extended or adjusted under 35 U.S.C. 154(b) by 0 days.

(21) Appl. No.: 10/013,175

(22) Filed: Dec. 7, 2001

(51) Int. Cl.⁷ ................................................ F16B 15/08
(52) U.S. Cl. .................. 411/442; 411/443; 411/485; 206/343
(58) Field of Search ......................... 411/5, 10, 442, 411/443, 485; 206/343, 344

(56) References Cited

U.S. PATENT DOCUMENTS

| | | | | |
|---|---|---|---|---|
| 2,140,593 A | * | 12/1938 | Pankonin | 411/443 |
| 3,187,621 A | * | 6/1965 | Turner | 411/10 |
| 5,667,346 A | * | 9/1997 | Sharp | 411/5 X |
| 5,971,688 A | * | 10/1999 | Anstett | 411/442 X |

FOREIGN PATENT DOCUMENTS

| | | | | |
|---|---|---|---|---|
| GB | 2107018 | * | 4/1983 | 411/10 |

* cited by examiner

Primary Examiner—Neill Wilson
(74) Attorney, Agent, or Firm—Thomas I. Rozsa; Tony D. Chen

(57) ABSTRACT

A collation strip of a plurality of adjacent fasteners interlocked together by a pair of protuberances and a pair of indentations. Each fastener has two protuberances located on one side and two corresponding and aligned indentations located on the other side, wherein the two protuberances of each fastener respectively engaged with the two indentations of an adjacent fastener, thereby interlocking two adjacent fasteners together. In a broader embodiment, each fastener has at least one protuberance located on one side and at least one corresponding and aligned indentation located on the other side wherein the at least one protuberance of each fastener respectively engages with the at least one indentation of an adjacent fastener, thereby interlocking two adjacent fasteners together.

10 Claims, 1 Drawing Sheet

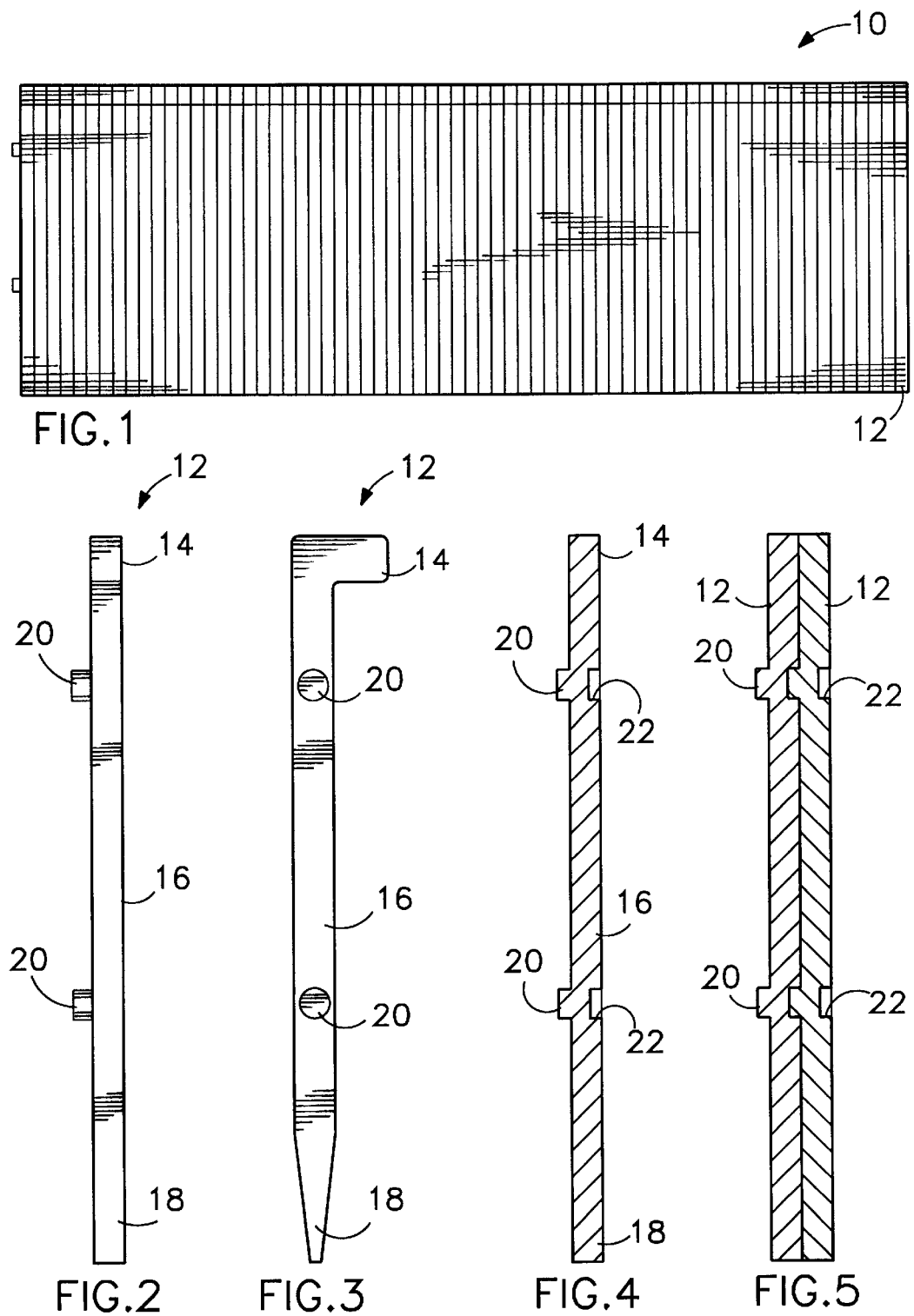

APPARATUS AND METHOD OF MANUFACTURING AND COLLATING A PLURALITY OF ADJACENT FASTENERS

BACKGROUND OF THE INVENTION

1. Field of the Invention

The present invention relates generally to the field of fasteners. More particularly, the present invention relates to an apparatus and method of manufacturing and collating a plurality of adjacent fasteners which may be readily inserted into tools which are hand activated or power activated to provide a supply of fasteners thereto.

2. Description of the Prior Art

Specifically, power actuated tools for driving fasteners are widely used in the construction industry. Many of these power actuated tools are equipped to hold a plurality of fasteners so as to provide for continuous feeding of the fasteners and facilitate the continuous operation of the tool. To facilitate the expeditious loading of fasteners into power tools various devices such as magazines, clips, strips, fastener packages or the like are well known in the art. Also, glue, adhesive or tape are used for retaining a plurality of fasteners together for loading them into the power actuated tool.

It is desirable to provide an improved apparatus and method of manufacturing and collating a plurality of adjacent fasteners interlocking them together for loading them into a power actuated tool.

SUMMARY OF THE INVENTION

The present invention is a novel and unique collation strip of a plurality of adjacent fasteners interlocked together by a pair of protuberances and a pair of indentations. Each fastener has two protuberances located on one side and two corresponding and aligned indentations located on the other side. The unique interlocking feature of the present invention provides various advantages. For example, it allows the fastener to be completely separated from the adjacent fastener upon deployment by a power actuated tool and/or a hand actuated tool.

It is an object of the present invention to provide a collation strip having a plurality of adjacent fasteners, wherein each fastener has at least two protuberances formed on one side and at least two indentations formed on the other side and correspondingly aligned with the at least two protuberances, so that at least two protuberances of each fastener are respectively engaged with at least two indentations of an adjacent fastener, thereby interlocking two adjacent fasteners together.

It is an additional object of the present invention to provide a collation strip having a plurality of fasteners wherein each fastener has at least one protuberance formed on one side and at least one corresponding indentation formed on the other side and correspondingly, aligned with the at least one protuberance, so that at least one protuberance of each fastener is respectively engaged with the at least one indentation of an adjacent fastener, thereby interlocking two adjacent fasteners together.

It is a further object of the present invention to provide a method of manufacturing and collating a plurality of adjacent fasteners so that they are interlocked together.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an elevational view of a collation strip of a plurality of adjacent fasteners interlocked together in accordance with the present invention;

FIG. 2 is a front elevational view of one of the plurality of adjacent fasteners shown in FIG. 1;

FIG. 3 is a side elevational view of one of the plurality of adjacent fasteners shown in FIG. 1;

FIG. 4 is a cross-sectional view taken along line 4—4 of FIG. 3; and FIG. 5 is a cross-sectional view similar to FIG. 4 with two adjacent fasteners showing the interlocked feature in accordance with the present invention.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is illustrated at 10 a collation strip constructed in accordance with the present invention which is suitable for use in conjunction with a power actuated tool and/or a hand actuated tool (not shown). By way of example, the power actuated tool can be a pneumatic tool. By way of example, the hand actuated tool can be a spring loaded mallet wherein the fasteners on the collation strip are hammered in. The collation strip 10 comprises a plurality of adjacent fasteners 12 interlocked together. These fasteners 12 may be flooring cleats or other suitable fasteners.

Referring to FIGS. 2 through 5, the plurality of fasteners 12 are substantially identical, and to the extent they are, only one will be described in detail below. Each fastener 12 has a generally L-shaped body with an L-shaped head portion 14, a driven tip 18, and a shank portion 16 that extends down from the head potion 14 to the driven tip 18. Each adjacent fastener 12 is interlocked together by a pair of spaced apart small protuberances or bosses 20 integrally formed on one side of the shank portion 16 and a pair of corresponding and aligned spaced apart small indentations or recesses 22 integrally formed on the other side of the shank portion 16 (see FIG. 4).

The diameter of each indentation 22 is slightly smaller than the diameter of each protuberance, thereby providing a pressed-fit assembly.

It will be appreciated that the protuberances and indentations are not limited to the located on the shank portion 16 of each fastener 12. It is emphasized that while the shank portion 16 is the preferred location, it is also within the spirit and scope of the present invention to have one each of the protuberances and indentations located on the head portion 14 and another one located on the shank portion 16 of the driven tip 18.

Referring to FIG. 5, to assemble the plurality of fasteners 12 together, the pair of small protuberances 20 of each fastener are respectively inserted and engaged with the pair of small indentations 22 of an adjacent fastener 12, and thereby interlocks two adjacent fasteners 12 together, to form the collation strip 10 of a plurality of adjacent fasteners 12.

While the preferred embodiment is to have a pair of protuberances corresponding with a pair of indentations, it is also within the spirit and scope of the present invention to have at least one protuberance 20 and at least one indentation 22 as described above rather than having a pair of protuberances and indentations. The embodiment with the pair of protuberances and indentations is stronger and more secure but the broader embodiment having only one protuberance with a corresponding one indentation is also within the spirit and scope of the present invention. Accordingly, the at least one protuberance can be anywhere on the shank 16 or instead, located on the head portion 14 or adjacent the driven tip 18 and the corresponding indentation 20 is located at a corresponding location so as to interlock with the at least one protuberance of the adjacent fastener.

It will be appreciated that the present invention is not limited to the flooring cleats as illustrated. It is emphasized that while the flooring cleats are preferred, it is also within the spirit and scope of the present invention that a collation strip made in accordance with the present invention may be used in conjunction with any one of a variety of headed fasteners such as roofing nails, pins, tacks, bolts, screws or the like.

Defined in detail, the present invention is a collation strip having a plurality of adjacent fasteners, each fastener comprising: (a) the each fastener having a head portion, a driven tip and a shank portion extending downwardly from the head portion to the driven tip; (b) a pair of spaced apart small protuberances formed on one side of the shank of the each fastener; (c) a pair of spaced apart indentations formed on the other side of the shank of the each fastener and correspondingly aligned with the pair of protuberances; and (d) the pair of spaced apart small protuberances of the each fastener respectively engaged with the pair of spaced apart indentations of an adjacent fastener, thereby interlocking two adjacent fasteners together.

Defined broadly, the present invention is a collation strip having a plurality of adjacent fasteners, each fastener comprising: (a) the each fastener having at least two protuberances formed on one side and at least two indentations formed on the other side and correspondingly aligned with the at least two protuberances; and (b) the at least two protuberances of the each fastener respectively engaged with the at least two indentations of an adjacent fastener, thereby interlocking two adjacent fasteners together.

Alternatively defined in detail, the present invention is a collation strip having a plurality of adjacent fasteners, each fastener comprising: (a) the each fastener having a head portion, a driven tip and shank portion extending downwardly from the head portion to the driven tip; (b) at least one small protuberance formed on one side of the shank of the each fastener; (c) at least one indentation formed on the other side of the shank of the each fastener and correspondingly in line with the at least one protuberance; and (d) the at least one protuberance of the each fastener respectively engaged with the at least one indentation of an adjacent fastener thereby interlocking two adjacent fasteners together.

Alternatively defined broadly, the present invention is a collation strip having a plurality of adjacent fasteners, each fastener comprising: (a) the each fastener having at least one protuberance formed on one side and at least one indentation formed on the other side and correspondingly aligned with the at least one protuberance; and (b) the at least one protuberance of the each fastener respectively engaged with the at least-one indentation of an adjacent fastener, thereby interlocking two adjacent fasteners together.

Further defined even more broadly, the present invention is a collation strip having at least two adjacent fasteners, each fastener comprising: (a) the each fastener having at least one protuberance formed on one side and at least one indentation formed on the other side and correspondingly aligned with the at least one protuberance; and (b) the at least one protuberance of the each fastener engaged with the at least one indentation of an adjacent fastener, thereby interlocking two adjacent fasteners together.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A collation strip having a plurality of adjacent fasteners, each fastener comprising:
    a. said each fastener having a head portion, a driven tip and a shank portion extending downwardly from the head portion to the driven tip;
    b. a pair of spaced apart small protuberances formed on one side of said shank of said each fastener;
    c. a pair of spaced apart indentations formed on the other side of said shank of said each fastener and correspondingly aligned with said pair of protuberances; and
    d. said pair of spaced apart small protuberances of said each fastener respectively engaged with said pair of spaced apart indentations of an adjacent fastener, thereby interlocking two adjacent fasteners together.

2. The collation strip in accordance with claim 1, wherein said head portion of said each fastener has a generally L-shape.

3. A collation strip having a plurality of adjacent fasteners, each fastener comprising:
    a. said each fastener having at least two protuberances formed on one side and at least two indentations formed on the other side and correspondingly aligned with the at least two protuberances;
    b. said at least two protuberances of said each fastener respectively engaged with said at least two indentations of an adjacent fastener, thereby interlocking two adjacent fasteners together; and
    c. each said fastener having an L-shaped head portion, a driven tip and a shank portion extending downwardly from the head portion to the driven tip.

4. The collation strip in accordance with claim 3, wherein said at least two protuberances and said at least two indentations are located on said shank portion of said each fastener.

5. A collation strip having a plurality of adjacent fasteners, each fastener comprising:
   a. said each fastener having a head portion, a driven tip and shank portion extending downwardly from the head portion to the driven tip;
   b. at least one small protuberance formed on one side of said shank of said each fastener;
   c. at least one indentation formed on the other side of said shank of said each fastener and correspondingly in line with said at least one protuberance;
   d. said at least one protuberance of said each fastener respectively engaged with said at least one indentation of an adjacent fastener thereby interlocking two adjacent fasteners together; and
   e. said head portion of said each fastener has a generally L shape.

6. A collation strip having a plurality of adjacent fasteners, each fastener comprising:
   a. said each fastener having at least one protuberance formed on one side and at least one indentation formed on the other side and correspondingly aligned with the at least one protuberance;
   b. said at least one protuberance of said each fastener respectively engaged with said at least one indentation of an adjacent fastener, thereby interlocking two adjacent fasteners together; and
   c. said each fastener has an L-shaped head portion, a driven tip and a shank portion extending downwardly from the head portion to the driven tip.

7. The collation strip in accordance with claim 6 wherein said at least one protuberance and said at least one indentation are located on said shank portion of said each fastener.

8. A collation strip having at least two adjacent fasteners, each fastener comprising:
   a. said each fastener having at least one protuberance formed on one side and at least one indentation formed on the other side and correspondingly aligned with the at least one protuberance;
   b. said at least one protuberance of said each fastener engaged with said at least one indentation of an adjacent fastener, thereby interlocking two adjacent fasteners together; and
   c. said each fastener has an L-shaped head portion, a driven tip and a shank portion extending downwardly from the head portion to the driven tip.

9. The collation strip in accordance with claim 8, wherein said at least one protuberance and said at least one indentation are located on said shank portion of said each fastener.

10. The collation strip in accordance with claim, 8, wherein said each fastener further has another protuberance located remote from the at least one protuberance and another indentation located remote from the at least one indentation and correspondingly aligned with the another protuberance.

\* \* \* \* \*